(12) United States Patent
Singh et al.

(10) Patent No.: US 8,565,251 B2
(45) Date of Patent: Oct. 22, 2013

(54) MAC ADDRESS TABLE COLLECTION IN DISTRIBUTED SWITCHING SYSTEMS

(75) Inventors: Bijendra Singh, Plano, TX (US); Arun Saha, Fremont, CA (US); Arindam Paul, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 198 days.

(21) Appl. No.: 13/160,283

(22) Filed: Jun. 14, 2011

(65) Prior Publication Data

US 2012/0320930 A1    Dec. 20, 2012

(51) Int. Cl.
*H04L 12/28*      (2006.01)
*H04L 12/56*      (2011.01)

(52) U.S. Cl.
USPC .......... 370/419; 370/395; 370/389; 370/235; 370/392; 370/401

(58) Field of Classification Search
None
See application file for complete search history.

(56) References Cited

U.S. PATENT DOCUMENTS

| | | | |
|---|---|---|---|
| 6,735,198 B1 * | 5/2004 | Edsall et al. | 370/389 |
| 7,636,356 B1 * | 12/2009 | Melman et al. | 370/392 |
| 2009/0219817 A1 * | 9/2009 | Carley | 370/235.1 |
| 2011/0069711 A1 * | 3/2011 | Jha et al. | 370/395.53 |

* cited by examiner

*Primary Examiner* — Andrew Chriss
*Assistant Examiner* — Ajit Reddy
(74) *Attorney, Agent, or Firm* — Baker Botts L.L.P.

(57) ABSTRACT

In accordance with embodiments of the present disclosure, a switch may include a processor and a plurality of line cards, each line card including a table of addresses. The processor may be configured to: (i) read, from a first line card of the plurality of line cards, addresses relating to all flooding domains present on the first line card; (ii) store the addresses read from the first line card on a memory accessible to the processor; (iii) determine a second line card of the plurality of line cards, the second line card having the presence of at least one flooding domain not present on the first line card; (iv) read, from the second line card, addresses relating to all flooding domains present on the second line card; and (v) store the addresses read from the second line card on the memory.

3 Claims, 8 Drawing Sheets

```
                       f;
         while( true ) {
             // Find card with the most present flooding domains
             highestFreqCardIndex =
                 lowest column-index 'ci' such that bitmap [ ci ] column,
                 i.e. bitmap [ *, ci ], has highest number
    804          of '1' bits among all columns
             highestFreq        =
                 number of '1' bits in bitmap [ highestFreqCardIndex ] column,
                 i.e. bitmap [ *, highestFreqCardIndex ]

806   // Algorithm stopping condition
          if( highestFreq == 0 ) {
              break;
          }

808 — readMacAddressesFromCard( highestFreqCardIndex );

810 — pruneMatrix( bitmap , highestFreqCardIndex );
         }
                                          // For all domains, if it is present in the card 'cardRead', then
                                          // entries for that domain is (already) read from this card
                                          // 'cardRead'. So, it is not necessary to read entries of such
                                          // domains from other cards. In this function, such matrix cells
                                          // are marked as '0' // so that we don't have to worry about them
                                          // anymore.
                                          pruneMatrix( bitmap , cardRead ) {
                                              for( domain = 1; domain <= D; domain += 1 ) {
                                                  if( bitmap [ domain, cardRead ] == 1 ) {
                                                      for( cardIndex = 1; cardIndex <= C; cardIndex += 1 ) {
                                                          bitmap [ domain, cardIndex ] = 0;
                                                      }
                                                  }
                                              }
                                          }
```

```
    C = number of line cards in system;
    D = number of flooding domains in system;
404 {
    for( x = 1;  x <= D;  x += 1 ) {
        406   408   416

// Find the first card where the domain 'x' is present
            firstCardIndex =
                lowest index 't' such that bitmap[ x, t ] == 1, or
                -1 if no such 't'
410 {
        // If this domain is not present in any card, then
        // skip to the next domain (next value of 'x'
        // in the outer 'for' loop)
        if( firstCardIndex == -1 ) {
            continue;
        }

412 {   // Read contents of *all* domains from this card// For all domains, if it is present in the card 'cardRead', then
        readMacAddressesFromCard( firstCardIndex ); // entries for that domain is (already) read from this card
                                                   // 'cardRead'. So, it is not necessary to read entries of such
                                                   // domains from other cards. In this function, such matrix cells
414 ~   pruneMatrix( bitmap, firstCardIndex );     // are marked as '0' // so that we don't have to worry about them
                                                   // anymore.
        pruneMatrix( bitmap , cardRead ) {
            for( domain = 1; domain <= D; domain += 1 ) {
                if( bitmap [ domain, cardRead ] == 1 ) {
                    for( cardIndex = 1; cardIndex <= C; cardIndex += 1 )
                        bitmap [ domain, cardIndex ] = 0;
                }
            }
        }
    }
}
```

*FIG. 6*

| | | CARDS | | | |
|---|---|---|---|---|---|
| | | 1 | 2 | 3 | 4 |
| FLOODING DOMAINS | 1 | 1 | 0 | 1 | 1 |
| | 2 | 0 | 0 | 0 | 0 |
| | 3 | 0 | 0 | 0 | 0 |
| | 4 | 0 | 0 | 0 | 0 |
| | 5 | 0 | 0 | 1 | 0 |

| | | CARDS | | | |
|---|---|---|---|---|---|
| | | 1 | 2 | 3 | 4 |
| FLOODING DOMAINS | 1 | 0 | 0 | 0 | 0 |
| | 2 | 0 | 0 | 0 | 0 |
| | 3 | 0 | 0 | 0 | 0 |
| | 4 | 0 | 0 | 0 | 0 |
| | 5 | 0 | 0 | 0 | 0 |

```
      f;
      while( true ) {
         // Find card with the most present flooding domains
         highestFreqCardIndex =
            lowest column-index 'ci' such that bitmap [ ci ] column,
            i.e. bitmap [ *, ci ], has highest number
            of '1' bits among all columns
         highestFreq =
            number of '1' bits in bitmap [ highestFreqCardIndex ] column,
            i.e. bitmap [ *, highestFreqCardIndex ]
         // Algorithm stopping condition
         if( highestFreq == 0 ) {
            break;
         }
808 ─── readMacAddressesFromCard( highestFreqCardIndex );
810 ─── pruneMatrix( bitmap , highestFreqCardIndex );
      }
         // For all domains, if it is present in the card 'cardRead', then
         // entries for that domain is (already) read from this card
         // 'cardRead'. So, it is not necessary to read entries of such
         // domains from other cards. In this function, such matrix cells
         // are marked as '0' // so that we don't have to worry about them
         // anymore.
         pruneMatrix( bitmap, cardRead ) {
            for( domain = 1; domain <= D; domain += 1 ) {
               if( bitmap [ domain, cardRead ] == 1 ) {
                  for( cardIndex = 1; cardIndex <= C; cardIndex += 1 ) {
                     bitmap [ domain, cardIndex ] = 0;
                  }
               }
            }
         }
``` braces on left mark regions labeled 804 (highestFreqCardIndex / highestFreq assignments) and 806 (algorithm stopping condition).

FIG. 9

MAC ADDRESS TABLE COLLECTION IN DISTRIBUTED SWITCHING SYSTEMS

TECHNICAL FIELD OF THE INVENTION

The present invention relates generally to networked communications and, more particularly, to efficient collection of MAC address entries from distributed MAC address tables, for example, in order to provide a centralized and unified view of system MAC address table.

BACKGROUND

In distributed switching systems, switching entities perform information forwarding, learning, and aging out of forwarding entries. If a switching entity contains multiple switching subunits, each switching subunit may have its own forwarding table in which information about network addresses is stored. Switching functionalities such as information forwarding, learning, and aging out of forwarding entries are carried out on a per-switching subunit basis. This architecture requires that most of the configurations to operate a switch need to be applied on a per-switching subunit basis and must be repeated for each switching subunit.

SUMMARY

In accordance with embodiments of the present disclosure, a switch may include a processor and a plurality of line cards, each line card including a table of addresses. The processor may be configured to read, from a first line card of the plurality of line cards, addresses relating to all flooding domains present on the first line card. The processor may also be configured to store the addresses read from the first line card on a memory accessible to the processor. The processor may additionally be configured to determine a second line card of the plurality of line cards, the second line card having the presence of at least one flooding domain not present on the first line card. The processor may further be configured to read, from the second line card, addresses relating to all flooding domains present on the second line card. The processor may also be configured to store the addresses read from the second line card on the memory.

Certain embodiments of the invention may provide one or more technical advantages. For example, methods and systems disclosed herein may provide for improved MAC address table collection, as the total number of line cards read may be reduced, as compared to traditional approaches.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 6 sets forth pseudocode setting forth an algorithm for performing the method of FIG. 4, in accordance with embodiments of the present disclosure;

FIG. 9 sets forth pseudocode setting forth an algorithm for performing the method of FIG. 8, in accordance with embodiments of the present disclosure.

DETAILED DESCRIPTION

Figure 1:
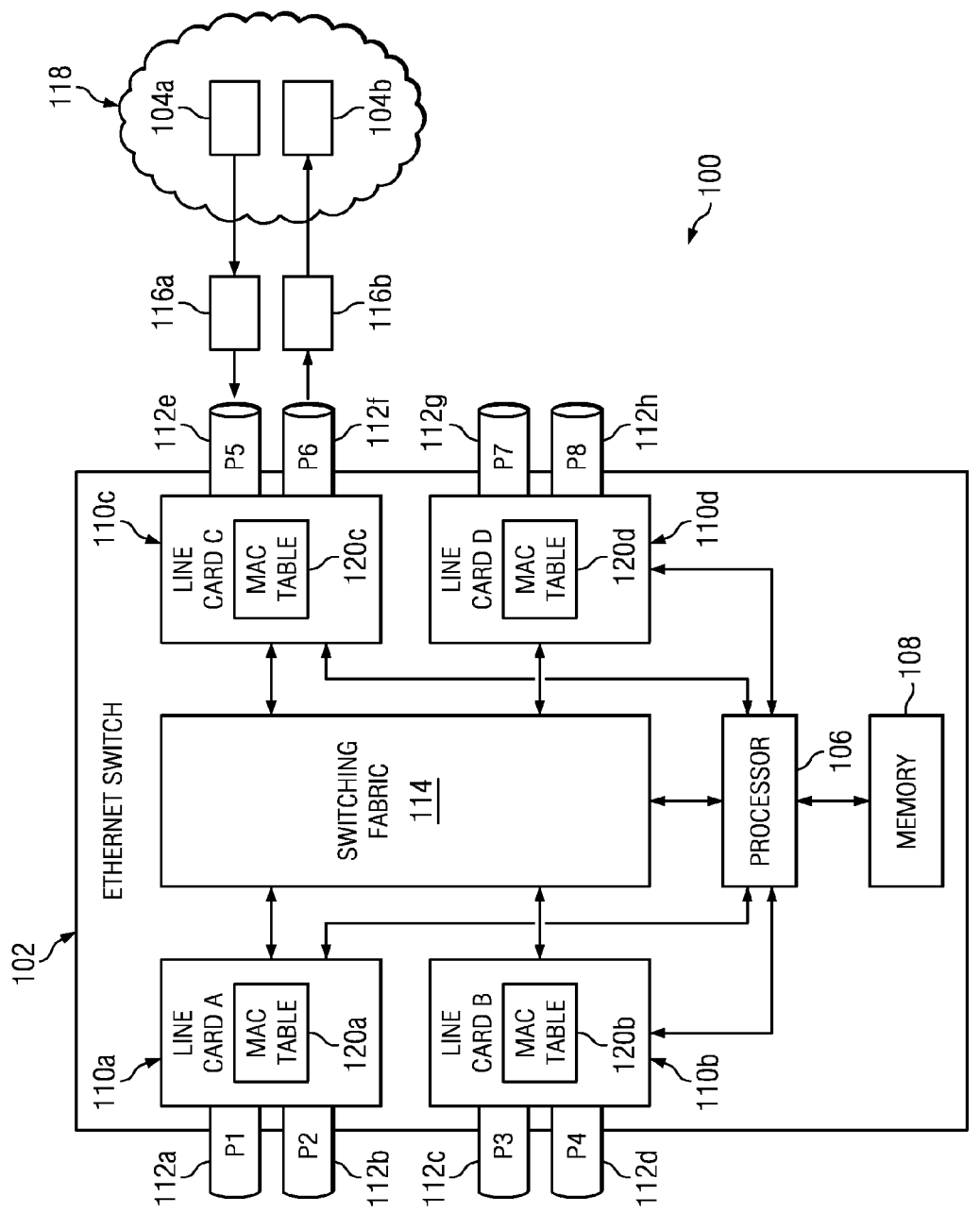
FIG. 1 is an example of a switching system based upon a switch configured to forward information between networks, computing entities, or other switching entities, in accordance with embodiments of the present disclosure.

FIG. 1 is an example of a switching system 100 based upon a switch 102 configured to forward information between networks, computing entities, or other switching entities. Switch 102 may include one or more ports 112, each communicatively coupled to one or more network entities 104. Such coupling may be accomplished over a network 118. Switch 102 may include one or more line cards 110, coupled to each other by way of a switching fabric 114. Switch 102 may include a table 120 specific to each line card 110. Tables 120 may include communication and forwarding information regarding network entities connected to ports 112 for which addresses have been learned. Switch 102 may include a processor 106 coupled to a memory 108. Processor 106 may be coupled to switching fabric 114 and the line cards 110.

Inbound frame 116a may be implemented in packets, frames, cells, or other received data to be forwarded. When an inbound frame 116a is received into a given port 112, the destination of the information may be looked up in table 120 to determine which port 112 the information should be sent. As demonstrated in FIG. 1 and in subsequent figures, inbound frame 116a may be received on any suitable port 112 of switch 102.

Switch 102 may be implemented in any suitable electronic device for carrying out the embodiments taught by the present disclosure. In one embodiment, switch 102 may be implemented as an Ethernet switch. Switch 102 may be configured to receive information to be forwarded to network destinations, and the information may be implemented in any form suitable for switch 102 to forward. In one embodiment, the information received may be implemented in an inbound frame 116a. Likewise, switch 102 may be configured to forward information in any suitable form, and likely the same form in which it was received. In one embodiment, the forwarded information may be implemented in an outbound frame 116b.

Switch 102 may be configured to communicate with any suitable network entity 104 to receive and send information such as frames 116. Network entities 104 may be embodied by, for example, a computer, router, switch, network device, sub-network or network. Network 118 may be embodied by, for example, a local-area-network, wide-area-network, the Internet, an intranet, or any other suitable communications network. Switch 102 may be configured to send and receive information through ports 112 on their respective line cards 110. Switch 102 may be configured to determine upon receipt of a frame 116a, which of the ports 112 should the outbound frame 116b be sent, based in part upon the contents of tables 120 associated with each line card. Switch 102 may be configured to act upon received information by the configuration of line cards 110, switching fabric 114, and/or processor 106.

Line cards 110 may be implemented in any suitable manner to create the embodiments described in this disclosure. In one embodiment, line cards 110 may be implemented in a module including electronic circuitry, processors, and/or memory for handling communications through one or more ports 112. Each line card 110 may contain a table 120. In one embodiment, each table 120 may be implemented in the corresponding line card 110, such as being stored in a memory associated with the line card 110. In another embodiment, table 120 may be implemented elsewhere in switch 102. Line card 110 may be configured to determine to what other line cards 110 in switch 102, information received from port 112 should be forwarded. Line card 110 may be configured to make such determinations based on the contents of an associated table 120. Line card 110 may be configured to forward information received from port 112 to another line card 110 of switch 102 through switching fabric 114. Switching fabric 114 may be implemented in any suitable combination of hardware and software for connecting line cards 110 to each other to transmit information between the line cards 110. Switching fabric 114 may be controlled through configuration by processor 106.

Processor 106 may comprise, for example, a microprocessor, microcontroller, digital signal processor (DSP), application specific integrated circuit (ASIC), or any other digital or analog circuitry configured to interpret and/or execute program instructions and/or process data. Processor 106 may interpret and/or execute program instructions and/or process data stored in memory 108. Memory 108 may comprise any system, device, or apparatus configured to hold and/or house one or more memory modules. Each memory module may include any system, device or apparatus configured to retain program instructions and/or data for a period of time (e.g., computer-readable media). In one embodiment, each line card 110 may contain one or more memory modules, containing at least an associated table 120. In another embodiment, each line card 110 may share memory 108 to store tables 120.

Tables 120 may be implemented in any suitable manner to store and make available to switch 102 and line cards 110 information concerning other network entities 104 in switching system 100 and how the network entities 104 may be accessed through ports 112. Tables 120 may include, for example, information regarding addresses of network entities 104, information regarding flooding domains 202, and information regarding which port 112, the address may be reached. Tables 120 may be configured as forwarding tables to provide information to switch 102 on how to forward information to other entities. In one embodiment, each table 120 may be implemented in its respective line card 110. In another embodiment, tables 120 may be implemented together, but coupled to each line card 110. Tables 120 may be implemented, for example, in logic, a memory, or circuitry. If a table 120 is implemented in a line card 110, table 120 may be implemented in memory of line card 110.

Figure 2:
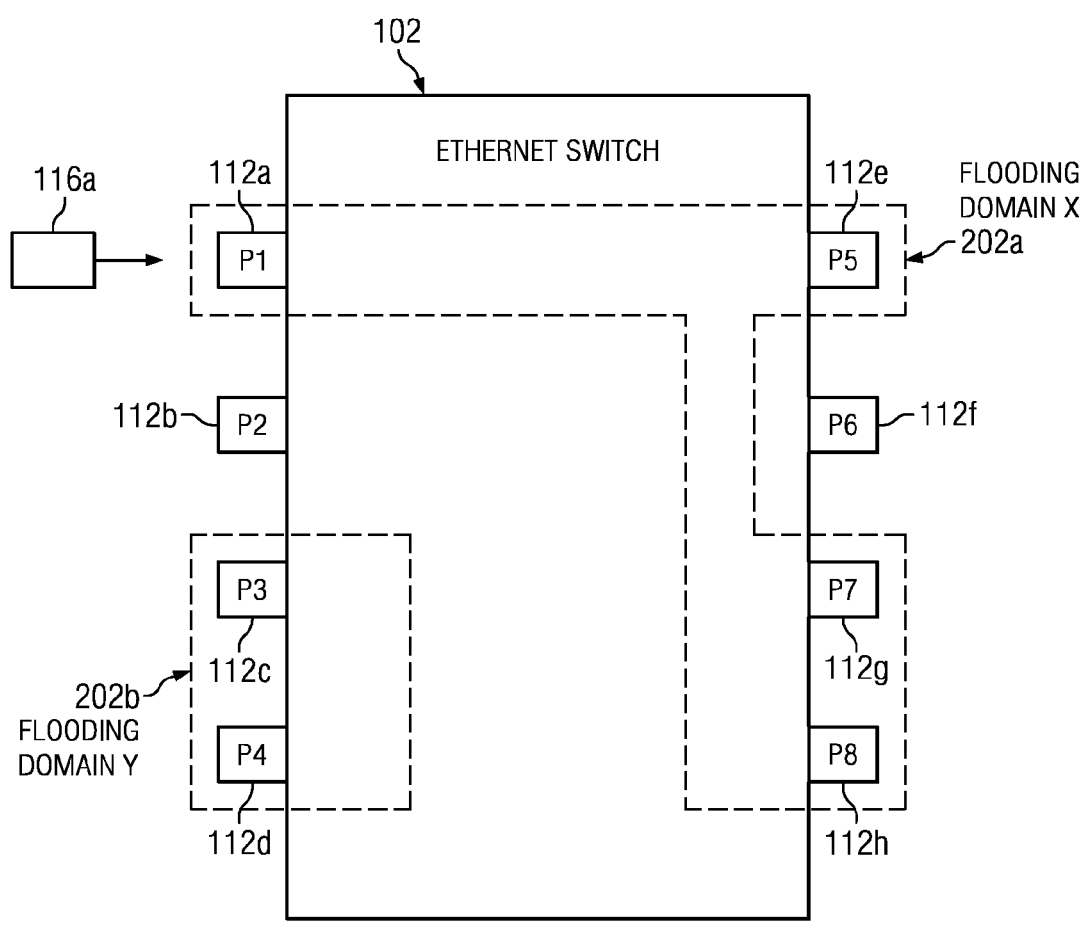
FIG. 2 is an illustration of an example assignment of one or more ports to a flooding domain, in accordance with embodiments of the present disclosure.

FIG. 2 is an illustration of an example assignment of one or more ports 112 to a flooding domains. In the example of FIG. 2, ports P1, P5, P7, and P8 are assigned to flooding domain 202a, while ports P3 and P4 are assigned to flooding domain 202b. Association of ports with flooding domains may be accomplished by processor 106, switching fabric 114, or any other suitable portion of switch 102. Flooding domains 202 may be associated with a VLAN. A flooding domain 202 may represent all ports 112 of switch 102 that may be flooded if the actual location of the destination of inbound frame 116a is not known. Such ports may be flooded by forwarding inbound frame 116a to each network destination 104 coupled to each such port 112. In the example of FIG. 2, an inbound frame 116a may be received on port P1. For example, if inbound frame 116a contains a destination MAC address of "0000.0000.1111," and no such entry exists in the tables associated with the flooding domain, then the frame may be forwarded through ports P5, P7, and P8. If such an address was known in the tables associated with the flooding domain, then the entry for the address would identify the appropriate egress port through which the frame would be sent. The ports 112 of switch 102 may be arranged into flooding domains 202 in any suitable fashion. In one embodiment, the ports 112 of switch 102 may be rearranged during operation of the switch 102. A port 112 of switch 102 may be associated with more than one flooding domain 202. In such a case, such a port 112 may forward information assigned to more than one flooding domain to the network destination 104 coupled to such port 112.

Figure 3:
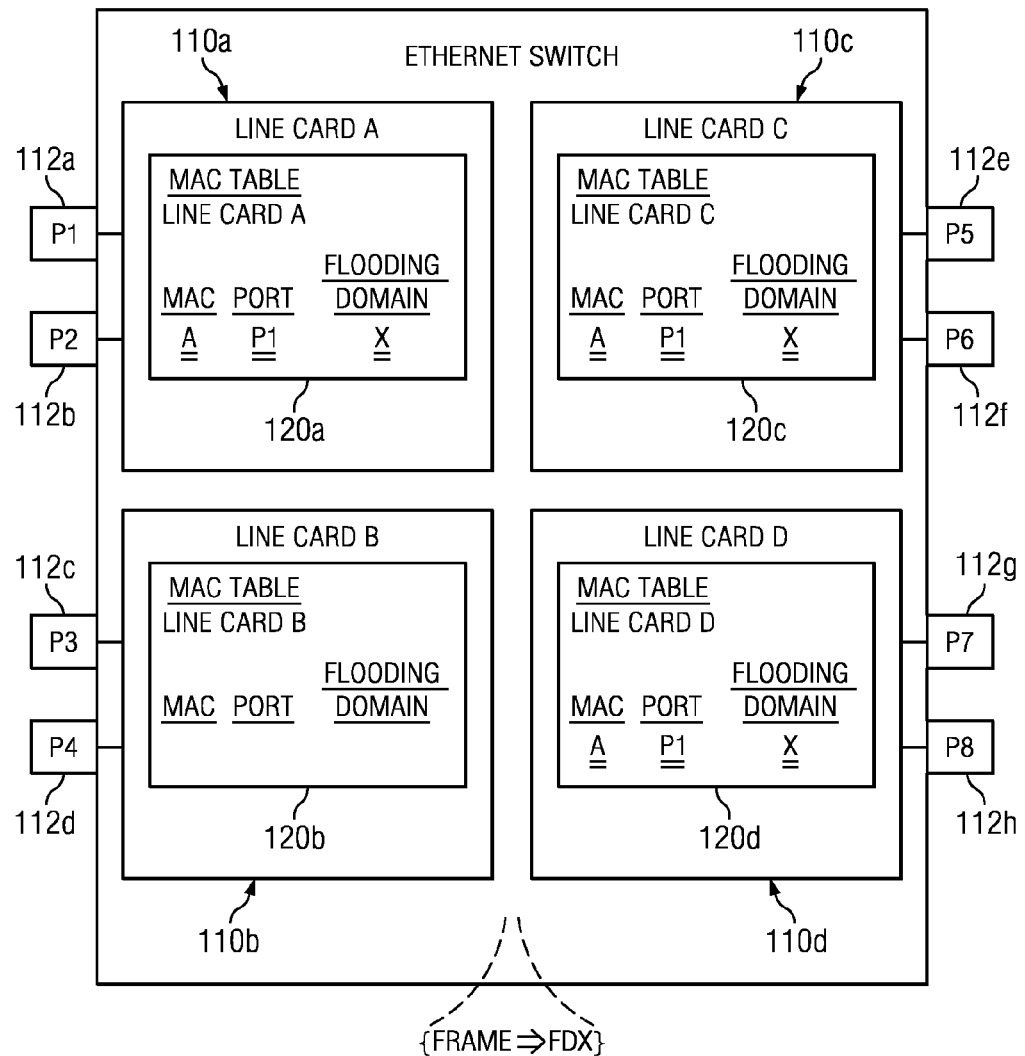
FIG. 3 is a more detailed illustration of the operation of a system and tables configured to provide efficient space utilization of distributed address tables in switches while flooding information, in accordance with embodiments of the present disclosure.

FIG. 3 is a more detailed illustration of distributed address tables 120 in switches 102. Table 120 may include information, for a given address and flooding domain, identifying which port 112 may be used to access the address. The addresses used by table 120 may comprise MAC addresses.

Traditionally, in order to acquire a consolidated view of all of the learned addresses in a switching system, a component of the switching system (e.g., a processor executing a program of instructions from a memory) may read all addresses from all tables present on the line cards of the switching system. Because of aging of entries, valid table entries may be spread over the entire index range of each table 120. Thus, when a table is read, the entire table has to be read, which may be wasteful, time-consuming and inefficient. In addition, because of the distributed nature of switches 120, identical entries may be present in tables 120 of multiple line cards 110. Thus, any address entry learned during reading of one line card 110 in a flooding domain may be replicated in all other line cards of the same flooding domain. Accordingly, if all line cards 110 are read and entries from all line card 110 are stored in a single table of entries, the table may require pruning to remove duplicate entries, which may be time consuming and taxing upon system resources.

Switching system 100 may be configured to improve MAC address table collection, as compared with traditional approaches. For example, switching system 100 may be configured to collect MAC address tables 120 such that if switching system 100 reads MAC addresses from a table 120 of a particular line card 110, the switching system may skip collection of MAC addresses on other line cards 110 where the same flooding domain 202 is present. Such MAC address table collection may be performed by one or more components of system 100 (e.g., by processor 106 reading and executing a program of instructions stored on memory 108). Example embodiments of such MAC address table collection are described below with respect to FIGS. 4-10B below.

Figure 4:
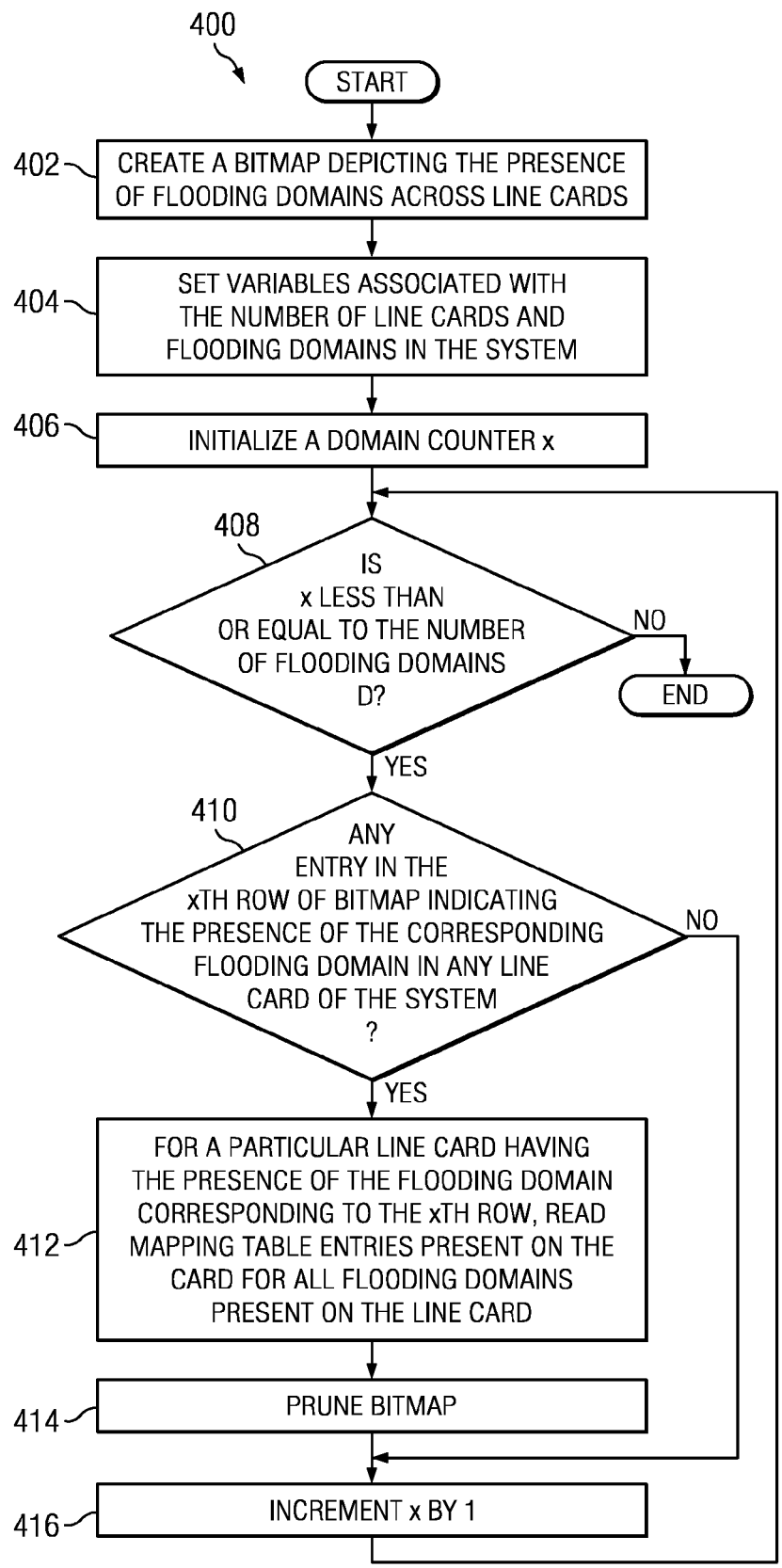
FIG. 4 illustrates a flow chart of an example method for address table collection in a switching system, in accordance with embodiments of the present disclosure.

FIG. 4 illustrates a flow chart of an example method 400 for address table collection in a switching system, in accordance with embodiments of the present disclosure. Method 400 may be performed by processor 106 (e.g., processor 106 reading and executing a program of instructions stored in memory 108) or another component of system 100. According to one embodiment, method 400 may begin at step 402. As noted above, teachings of the present disclosure may be implemented in a variety of configurations system 100. As such, the preferred initialization point for method 400 and the order of the steps 402-416 comprising method 400 may depend on the implementation chosen.

Figure 5:
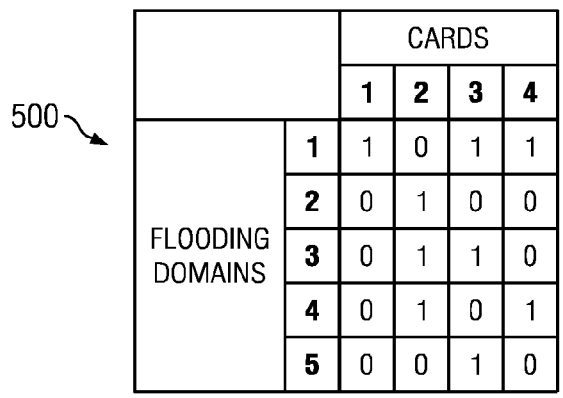
FIG. 5 depicts an example bit matrix for depicting the presence of flooding domains across line cards, in accordance with embodiments of the present disclosure.

At step 402, a system (e.g., system 100) may create a data structure depicting the presence of flooding domains across line cards. For example, the system may create a bit matrix for depicting the presence of flooding domains across line cards, as shown in the example bit matrix 500 of FIG. 5. As shown in FIG. 5, bit matrix 500 may, in some embodiments, be embodied in a matrix having a particular number of rows and a particular number of columns. In other embodiments, bit matrix 500 may be embodied in an array of bitsets. Bit matrix 500 may be stored in memory 108, or by another suitable component of system 100. Each entry in bit matrix 500 may indicate whether a particular flooding domain is present in a particular line card. For example, in certain embodiments of bit matrix 500, columns may correspond to line cards while rows may correspond to flooding domains in a system, such as shown in FIG. 5. In other embodiments of bit matrix 500, rows may correspond to line cards while columns may correspond to flooding domains in a system.

In embodiments in which columns correspond to line cards and rows correspond to flooding domains, bit matrix 500 may have a number of columns equal to the number of line cards in the system (such that each column represents a particular line card) and may have a number of rows equal to the number of flooding domains in the system (such that each row represents a particular flooding domain 202). Thus, for the example bit matrix 500 shown in FIG. 5, the system represented by bit matrix 500 has four line cards and five domains. Each entry in bit matrix 500 may have a value indicating whether or not the flooding domain represented by the row having the entry is present in the line card represented by the column having the entry. In some embodiments, each entry in bit matrix 500 may be binary (e.g, "0" or "1"). For example, an entry of "1" may indicate presence of a flooding domain in a line card, while an entry of "0" may indicate absence of a flooding domain in a line card 110. As will be seen below, an entry of "0" may also indicate a corresponding line card and/or domain from which mapping table entries have been collected. Thus, in example bit matrix 500 depicted in FIG. 5, flooding domain 1 is present on line cards 1, 3, and 4, flooding domain 2 is present on line card 2, flooding domain 3 is present on line cards 2 and 3, flooding domain 4 is present on line cards 2 and 4, and flooding domain 5 is present on line card 3.

At step 404, the system may set variables associated with the number of line cards 110 and flooding domains 202 in the system. For example, a variable C may be used to represent the number of line cards 110, and a variable D may be used to represent the number of flooding domains 202. Thus, for example bit matrix 500, C may equal 4 and D may equal 5.

At step 406, the system may initialize a domain counter, the domain counter at all times corresponding with a particular flooding domain. For example, the domain counter may be initialized to a value of 1, corresponding to the first row of bit matrix 500. For purposes of exposition, the domain counter may be represented by the variable "x" in the ensuing discussion.

At step 408, the system may determine if x is less than or equal to the number of flooding domains D. If x is less than or equal to the number of flooding domains D, method 400 may proceed to step 410. Otherwise, method 400 may end.

At step 410, the system may determine, whether any entry in the xth row of bit matrix 500 indicates the presence of the corresponding flooding domain in any line card of the system (e.g., whether any entry in the xth row has a value of "1"). If bit matrix 500 indicates the presence of the corresponding flooding domain in any line card of the system, method 400 may proceed to step 412. Otherwise, method 400 may proceed to step 416.

At step 412, the system may, for a particular line card at a column "y" having the presence of the flooding domain corresponding to the xth row, as indicated by the entry of element [x, y] in bit matrix 500 (e.g., M[x, y]=1, where "M" refers to bit matrix 500), read mapping table entries (e.g., present in a table 120) present on the card for all flooding domains present on the line card corresponding to the yth column. Mapping entries read may be stored in any suitable manner (e.g., on a memory, such as memory 108, for example). In some embodiments, the column y selected may be the column having the lowest index number (e.g., column 1 has a lower index number than column 2).

At step 414, the system may "prune" bit matrix 500, such that, for each flooding domain whose mapping table entries are collected in connection with the mapping entries read from the particular line card at step 412, entries in rows of bit matrix 500 corresponding to such flooding domains may be set to a value (e.g., 0) indicating that each such flooding domain is either: (a) not present on any line cards, or (b) mapping table entries for the domain have already been collected. This step permits method 400 to skip mapping table collection for other line cards in the loop performed by steps 408-416, as such mapping table entries may have already been collected from the entries read from the particular line card at step 412.

At step 416, the system may increment the domain counter x by 1, such that analysis continues on the subsequent row corresponding to the subsequent flooding domain of bit matrix 500. After completion of step 416, method 400 may proceed to step 408.

FIG. 6 sets forth pseudocode setting forth an algorithm for performing method 400, in accordance with embodiments of the present disclosure. The portions of the pseudocode corresponding to particular steps of method 400 are also depicted with the reference number of the corresponding step of method 400.

Figure 7A:
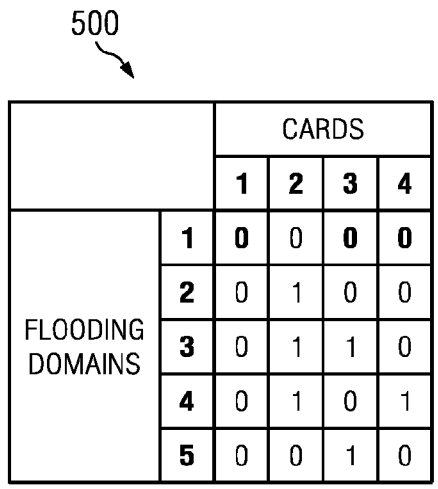
FIGS. 7A-7C illustrate application of the method of FIG. 4 to the bit matrix of FIG. 5, in accordance with embodiments of the present disclosure.
Figure 7B:
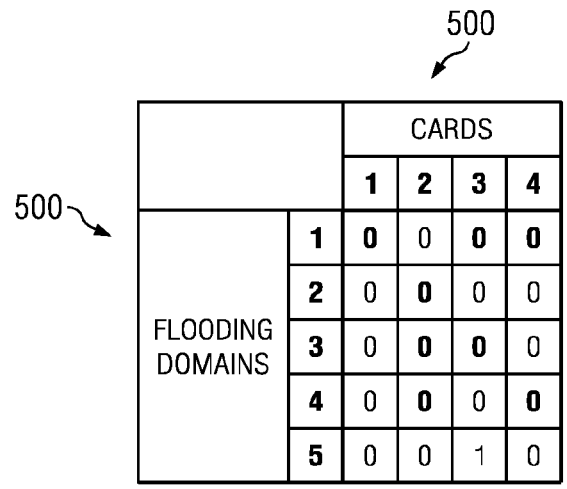
Figure 7C:
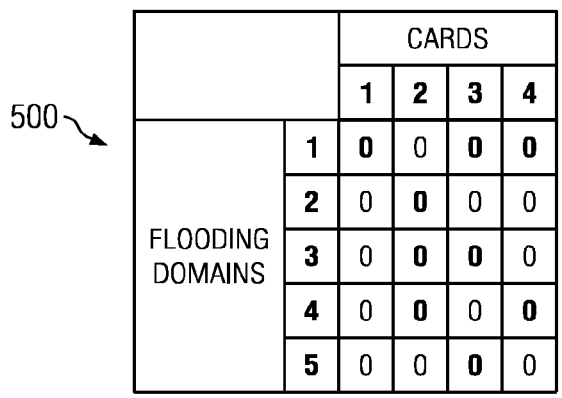

FIGS. 7A-7C illustrate application of method 400 to bit matrix 500, in accordance with embodiments of the present disclosure. During the first iteration of steps 408-416, the system may evaluate row 1 corresponding to flooding domain 1. The system may determine that flooding domain 1 has presence in line card 1 as indicated by entry [1,1] in bit matrix 500 as shown in FIG. 5. Accordingly, the system may read mapping entries from a map table of line card 1. After the system reads the mapping entries from line card 1, the system may prune bit matrix 500. The read of mapping entries of line card 1 would have collected entries from flooding domain 1 only, as that is the only flooding domain present on line card 1, as indicated by reading bit matrix 500 entries present in column 1. Accordingly, entries in row 1 of bit matrix 500 corresponding to flooding domain 1 may be set to 0, as depicted in FIG. 7A.

During the second iteration of steps 408-416, the system may evaluate row 2 corresponding to flooding domain 2. The system may determine that flooding domain 2 has presence in line card 2 as indicated by entry [2,2] in bit matrix 500 as shown in FIG. 7A. Accordingly, the system may read mapping entries from a map table of line card 2. After the system reads the mapping entries from line card 2, the system may prune bit matrix 500. The read of mapping entries of line card 2 would have collected entries from flooding domains 2, 3 and 4, as those flooding domains are present on line card 2, as indicated by reading bit matrix 500 entries present in column 2. Accordingly, entries in rows 2, 3, and 4 of bit matrix 500 corresponding to flooding domains 2, 3, and 4, respectively, may be set to 0, as depicted in FIG. 7B.

During the third iteration of steps 408-416, the system may evaluate row 3 corresponding to flooding domain 3. The system may determine that either: (a) flooding domain 3 has no presence in any line cards or (b) mapping entries for flooding domain 3 have already been collected, as indicated by all entries of row 3 having a value of 0, as shown in FIG. 7B. Accordingly, the system may progress to the next iteration of the loop defined by steps 408-416. During the fourth iteration of steps 408-416, the system may evaluate row 4 corresponding to flooding domain 4. The system may determine that either: (a) flooding domain 4 has no presence in any line cards or (b) mapping entries for flooding domain 4 have already been collected, as indicated by all entries of row 4 having a value of 0, as shown in FIG. 7B. Accordingly, the system may progress to the next iteration of the loop defined by steps 408-416.

During the fifth iteration of steps 408-416, the system may evaluate row 5 corresponding to flooding domain 5. The system may determine that flooding domain 5 has presence in line card 3 as indicated by entry [5,3] in bit matrix 500 as shown in FIG. 7B. Accordingly, the system may read mapping entries from a map table of line card 3. After the system reads the mapping entries from line card 3, the system may prune bit matrix 500. The read of mapping entries of line card 3 would have collected entries from flooding domain 5, as such flooding domains is present on line card 5, as indicated by reading bit matrix 500 entries present in column 3. Accordingly, entries in row 5 of bit matrix 500 corresponding to flooding domain 5 may be set to 0, as depicted in FIG. 7C. At completion of the fifth and final iteration, the system may have collected all mapping entries present in the system.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using system 100 or any other system operable to implement method 400. In certain embodiments, method 400 may be implemented partially or fully in software and/or firmware embodied in computer-readable media.

Figures 8, 10A, 10B:
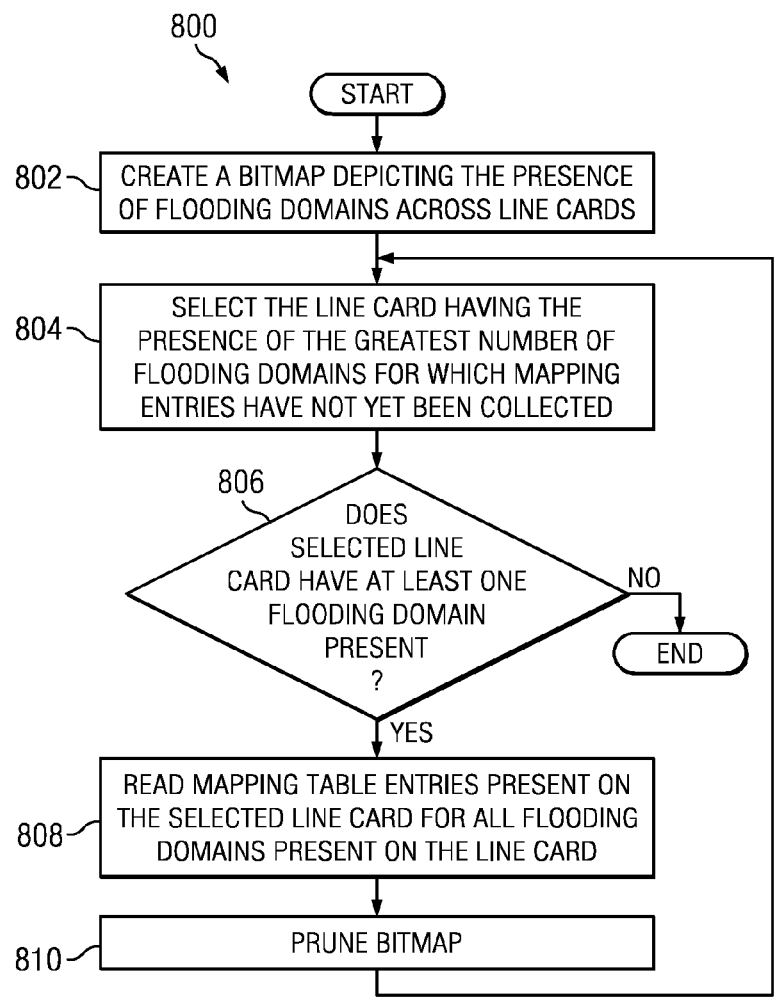
FIG. 8 illustrates a flow chart of another example method for address table collection in a switching system, in accordance with embodiments of the present disclosure.
FIGS. 10A and 10B illustrate application of the method of FIG. 8 to the bit matrix of FIG. 5, in accordance with embodiments of the present disclosure.

FIG. 8 illustrates a flow chart of another example method 800 for address table collection in a switching system, in accordance with embodiments of the present disclosure. Method 800 may be performed by processor 106 (e.g., processor 106 reading and executing a program of instructions stored in memory 108) or another component of system 100. According to one embodiment, method 800 may begin at step 802. As noted above, teachings of the present disclosure may be implemented in a variety of configurations system 100. As such, the preferred initialization point for method 800 and the order of the steps 802-810 comprising method 800 may depend on the implementation chosen.

At step 802, a system (e.g., system 100) may create a data structure depicting the presence of flooding domains across line cards. For example, the system may create a bit matrix for depicting the presence of flooding domains across line cards, as shown in the example bit matrix 500 of FIG. 5, as is discussed in detail above.

At step 804, the system may select the line card having the presence of the greatest number of flooding domains for which mapping entries have not yet been collected. This determination may be made by determining which column of bit matrix 500 has the greatest number of entries (e.g., entries of "1") indicating presence of a flooding domain for which mapping entries have not yet been collected. In the event two or more line cards/column each have the greatest number of flooding domains for which mapping entries have not yet been collected, the column/line card selected may be the column/line card having the lowest index number (e.g., column 1 has a lower index number than column 2).

At step 806, the system may determine if the selected line card has at least one flooding domain present. If the selected line card has at least one flooding domain present, method 800 may proceed to step 808. Otherwise, method 800 may end.

At step 808, the system may, for the selected line card, read mapping table entries (e.g., present in a table 120) present on the selected line card for all flooding domains present on the line card. Mapping entries read may be stored in any suitable manner (e.g., on a memory, such as memory 108, for example).

At step 810, the system may "prune" bit matrix 500, such that, for each flooding domain whose mapping table entries are collected in connection with the mapping entries read from the particular line card at step 808, entries in rows of bit matrix 500 corresponding to such flooding domains may be set to a value (e.g., 0) indicating that each such flooding domain is either: (a) not present on any line cards, or (b) mapping table entries for the domain have already been collected. This step permits method 800 to skip mapping table collection for other line cards in the loop performed by steps 804-810, as such mapping table entries may have already been collected from the entries read from the particular line card at step 808. Step 810 of method 800 may be similar or identical to step 414 of method 400. After completion of step 810, method 800 may proceed again to step 804.

FIG. 9 sets forth pseudocode setting forth an algorithm for performing method 800, in accordance with embodiments of the present disclosure. The portions of the pseudocode corresponding to particular steps of method 800 are also depicted with the reference number of the corresponding step of method 800.

FIGS. 10A and 10B illustrate application of method 800 to bit matrix 500, in accordance with embodiments of the present disclosure. During the first iteration of steps 804-810, the system may select line card 2 corresponding to column 2 as the line card having the greatest number of flooding domains for which mapping entries have nit been collected. The system may determine that line card 2/column 2 meets this criterion based on the fact that, as seen in FIG. 5, column 2 has the most entries with value "1" as compared with other columns (column 2 may be selected over column 3, despite column 3 having the same number of "1" entries because column 2 has a lower index number). Accordingly, the system may read mapping entries from a map table of line card 2. After the system reads the mapping entries from line card 2, the system may prune bit matrix 500. The read of mapping entries of line card 2 would have collected entries from flooding domains 2, 3 and 4, as those flooding domains are present on line card 2, as indicated by reading bit matrix 500 entries present in column 2. Accordingly, entries in rows 2, 3, and 4 of bit matrix 500 corresponding to flooding domains 2, 3, and 4, respectively, may be set to 0, as depicted in FIG. 10A.

During the second iteration of steps 804-810, the system may select line card 3 corresponding to column 3 as the line card having the greatest number of flooding domains for which mapping entries have not been collected. The system may determine that line card 3/column 3 meets this criterion based on the fact that, as seen in FIG. 10A, column 3 has the most entries with value "1" as compared with other columns. Accordingly, the system may read mapping entries from a map table of line card 3. After the system reads the mapping entries from line card 3, the system may prune bit matrix 500. The read of mapping entries of line card 3 would have collected entries from flooding domains 1 and 5, as those flooding domains are present on line card 3, as indicated by reading bit matrix 500 entries present in column 3. Accordingly, entries in rows 1 and 5 of bit matrix 500 corresponding to flooding domains 1 and 5, respectively, may be set to 0, as depicted in FIG. 10B.

During the third iteration of steps 804-810, the system may determine that no line card has a corresponding column in bit matrix 500 with any entries indicating the presence of flooding domains for which mapping entries have not been collected. Accordingly, method 800 may end. At completion of the third and final iteration, the system may have collected all mapping entries present in the system.

Although FIG. 8 discloses a particular number of steps to be taken with respect to method 800, method 800 may be executed with greater or fewer steps than those depicted in FIG. 8. In addition, although FIG. 8 discloses a certain order of steps to be taken with respect to method 800, the steps comprising method 400 may be completed in any suitable order.

Method 800 may be implemented using system 100 or any other system operable to implement method 800. In certain embodiments, method 800 may be implemented partially or fully in software and/or firmware embodied in computer-readable media.

Although the discussion of methods 400 and 800 describe specific approaches to analyzing a bit matrix 500 to perform improved table collection, it is understood that similar or analogous approaches may be used to perform table collection. For example, although method 800 analyzes bit matrix 500 to loop over cards in order of decreasing frequency of domain presence, in other embodiments a system may loop over cards in order in a column-major way, similar to the row-major way of method 400.

A component of system 100 may include an interface, logic, memory, and/or other suitable element. An interface receives input, sends output, processes the input and/or output, and/or performs other suitable operations. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. For the purposes of this disclosure, computer-readable media and/or computer-executable storage media may include any instrumentality or aggregation of instrumentalities that may retain data and/or instructions for a period of time. Computer-readable media and/or computer-executable storage media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Modifications, additions, or omissions may be made to system 100 without departing from the scope of the invention. The components of system 100 may be integrated or separated. Moreover, the operations of system 100 may be performed by more, fewer, or other components. Additionally, operations of system 100 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A switch, comprising:
   a plurality of line cards, each line card including a table of addresses;
   a memory comprising a data structure identifying the presence of flooding domains associated with each line card;
   a processor configured to:
   determine the line card of the plurality of line cards having the greatest number of associated flooding domains;
   read, from the determined line card, addresses relating to all flooding domains present on the determined line card;
   store the addresses read from the determined line card on the memory; and
   iteratively repeat the determining, reading and storing limitations for the line cards having at least one associated flooding domain that is not associated with the line cards for which addresses have been read and stored in the reading and storing limitations.

2. A method comprising:
   accessing a memory comprising a data structure identifying the presence of flooding domains associated with each line card of a plurality of line cards;
   determining the line card of the plurality of line cards having the greatest number of associated flooding domains;
   reading, from the determined line card, addresses relating to all flooding domains present on the determined line card;
   storing the addresses read from the determined line card on the memory; and
   iteratively repeating the determining, reading and storing limitations for the line cards having at least one associated flooding domain that is not associated with the line cards for which addresses have been read and stored in the reading and storing limitations.

3. An article of manufacture comprising:
   a non-transitory computer readable medium; and computer-executable instructions carried on the computer readable medium, the instructions readable by a processor, the instructions, when read and executed, for causing the processor to:

access a memory comprising a data structure identifying the presence of flooding domains associated with each line card of a plurality of line cards;

determine the line card of the plurality of line cards having the greatest number of associated flooding domains;

read, from the determined line card, addresses relating to all flooding domains present on the determined line card;

store the addresses read from the determined line card on the memory; and iteratively repeat the determining, reading and storing limitations for the line cards having at least one associated flooding domain that is not associated with the line cards for which addresses have been read and stored in the reading and storing limitations.

* * * * *